(12) United States Patent
Boehm et al.

(10) Patent No.: US 10,033,914 B2
(45) Date of Patent: Jul. 24, 2018

(54) OPTOELECTRONIC SURVEILLANCE SYSTEM WITH VARIABLE OPTICAL FIELD

(71) Applicant: SAFRAN ELECTRONICS & DEFENSE, Boulogne Billancourt (FR)

(72) Inventors: Bernard Boehm, Boulogne Billancourt (FR); Paul Echard, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 0 days.

(21) Appl. No.: 15/300,001

(22) PCT Filed: Mar. 27, 2015

(86) PCT No.: PCT/EP2015/056808
§ 371 (c)(1),
(2) Date: Sep. 28, 2016

(87) PCT Pub. No.: WO2015/144920
PCT Pub. Date: Oct. 1, 2015

(65) Prior Publication Data
US 2017/0208232 A1      Jul. 20, 2017

(30) Foreign Application Priority Data
Mar. 28, 2014   (FR) ..................................... 14 52727

(51) Int. Cl.
| | | |
|---|---|---|
| *H04N 7/00* | (2011.01) | |
| *H04N 5/225* | (2006.01) | |
| *H04N 7/18* | (2006.01) | |
| *H04N 5/232* | (2006.01) | |
| *G02B 27/64* | (2006.01) | |
| *G02B 26/08* | (2006.01) | |

(52) U.S. Cl.
CPC ....... *H04N 5/2259* (2013.01); *G02B 26/0875* (2013.01); *G02B 27/644* (2013.01); *H04N 5/23238* (2013.01); *H04N 7/183* (2013.01)

(58) Field of Classification Search
None
See application file for complete search history.

(56) References Cited

U.S. PATENT DOCUMENTS

| | | |
|---|---|---|
| 6,486,910 B1 | 11/2002 | Kaneda et al. |
| 2009/0122406 A1 | 5/2009 | Rouvinen et al. |
| 2012/0099852 A1 | 4/2012 | Staker et al. |

FOREIGN PATENT DOCUMENTS

JP      2005-175970 A      6/2005

*Primary Examiner* — James M Anderson, II
(74) *Attorney, Agent, or Firm* — Muncy, Geissler, Olds & Lowe, P.C.

(57) ABSTRACT

Optoelectronic surveillance system, comprising an acquisition unit including at least one sensor mounted behind a zoom having a group of movable lenses at the front and a group of fixed lenses at the rear, defining at least one first space in convergent rays, and a control unit connected to the acquisition unit and to a rotary optical element arranged so as to rotate about a first axis and secured to a drive member controlled by the control unit in order to modify a field perceived by the sensor independently of a movement of the acquisition unit about the first axis. The optical element is a first transparent plate mounted in the first space so as to rotate about the first axis, and the drive member is arranged so as to rotate the first plate in two opposite directions.

6 Claims, 1 Drawing Sheet

OPTOELECTRONIC SURVEILLANCE SYSTEM WITH VARIABLE OPTICAL FIELD

BACKGROUND OF THE INVENTION

Field of the Invention

The present invention relates to the field of daytime or night-time visual observation appliances and, more particularly, an optoelectronic surveillance system in the visible or infrared range.

Brief Discussion of the Related Art

Such an optoelectronic surveillance system is in particular used for monitoring the space surrounding a vehicle, in particular a land or sea vehicle, in order to detect the appearance of an obstacle, another vehicle or a projectile in the zone being monitored. To this end, the optoelectronic surveillance system is arranged to provide images of the space being monitored to an operator and to process the images with a view to issuing an alert automatically in the event of intrusion into the space being monitored.

An optoelectronic surveillance system generally comprises an acquisition unit comprising at least one sensor mounted behind a zoom having a substantially horizontal line of sight. The acquisition unit is mounted so as to turn about a substantially vertical axis and is connected to a control unit arranged so as to control the acquisition unit so as to capture images on the fly during the rotation of the acquisition unit about the vertical axis. The images will then be assembled in order to form panoramic images of the environment. This makes it possible to sweep the horizon over 360° around the acquisition unit.

It appears that these systems are more effective, the higher the rotation speed of the acquisition unit. However, the rotation speed is limited because of the integration time of the sensor, which is the time necessary for acquiring the image signal coming from a scene and is equivalent to the exposure time in photography. As a result, if the rotation speed is too high, the images are affected by movement fuzziness. This is all the more true with the infrared acquisition units used in cold geographical regions.

To remedy this drawback, disposing, in front of the zoom, a reflective optical element that is mounted so as to rotate about an axis parallel to the rotation axis of the acquisition member is known. The reflective optical element is in the form of a polygon, the faces of which parallel to the rotation axis are reflective and which is rotated in a direction opposite to the rotation direction of the acquisition unit, at a speed equal to half the rotation speed of the acquisition unit. Thus the opposite rotations of the reflective optical element and of the acquisition unit make it possible to keep the line of sight substantially fixed in the space of the scene observed for a time greater than the integration time of the sensor. These devices are heavy and bulky.

BRIEF SUMMARY OF THE INVENTION

One aim of the invention is to propose a surveillance system alternative to the known ones, having good performance while being relatively lightweight and compact.

To this end, according to the invention, an optoelectronic surveillance system is provided, comprising an acquisition unit including at least one sensor mounted behind a zoom having a group of movable lenses at the front and a group of fixed lenses at the rear, defining at least one first space in the convergent rays, and a control unit connected to the acquisition unit and to a rotary optical element arranged such as to rotate about a first axis and secured to a drive member controlled by the control unit in order to modify a field perceived by the sensor independently of a movement of the acquisition unit about the first axis. The optical element is a first transparent plate mounted in the first space so as to rotate about the first axis, and the drive member is arranged so as to rotate the first optical plate in two opposite directions.

The group of movable lenses forms a variable-focus optical device and the group of fixed lenses forms an imaging device the magnification factor of which depends on the lenses used. The optical element is merely a transparent plate with parallel faces disposed in the group of fixed lenses so as to prevent interference between the lenses and the plate. A modification to the position of the transparent plate with respect to the direction of the rays causes a translation of the rays that are passing through it and therefore an angular movement of the point to which these beams aim on the sensor. The movement, on the sensor side, is amplified, vis-à-vis the movement of the rays in the plate, by the magnification factor of the lenses situated between the plate and the sensor. The plate is rotated in order to modify the field seen by the sensor without movement of the acquisition unit. This makes it possible to compensate for the movements of the acquisition unit about the first axis and therefore to have more time for acquiring one or more images.

Preferably, the acquisition unit is mounted so as to turn about a second axis parallel to the first axis in a second rotation direction and the control unit is arranged so as to control the acquisition unit in order to capture images on the fly during the rotation of the acquisition unit about the second axis and the drive member in order to keep constant the field perceived by the sensor during a time of acquisition of at least one image.

When the axes are vertical, the surveillance system affords panoramic observation. In this application, the modification of the field is determined so as to allow either a relatively high rotation speed of the acquisition unit (the larger the field, the greater may be the rotation speed) or the capture of a plurality of images so as to add the images together and thus increase the signal/noise ratio.

According to a particular embodiment, the group of fixed lenses delimits at least a second space with convergent rays in which at least one second transparent plate is mounted so as to turn about a third axis and is secured to a drive member arranged so as to rotate the second transparent blade in two opposite directions and controlled by the control unit so as to modify a field perceived by the sensor independent of a movement of the acquisition unit about the third axis, the third axis being substantially perpendicular to the second axis.

The use of a second plate is particularly advantageous since it makes it possible to modify the field in another direction for example, in the case of a panoramic observation, in order to compensate for a non-vertical positioning of the second axis or to provide stabilisation of the aim.

Advantageously, the control unit is arranged so as to control the rotation of the plate and the sensor in order to capture at least two successive images of the same scene portion and to add these images in order to obtain a reconstituted image with the same resolution as the successive images.

Adding the images increases the signal to noise ratio and therefore the quality of images.

In a variant, the control unit is arranged so as to control the rotation of the plate and the sensor in order to capture successive images of the same scene portion.

It is then possible to process the images so as to add pixels of these images in order to obtain a reconstituted image with a lower resolution than the successive images. This reduction in the resolution is not necessarily a problem since in many applications the volume of image data is so great that it makes it necessary to compress the data to enable them to be displayed. The reduction in resolution would therefore be effected in any event.

Other features and advantages of the invention will emerge from a reading of the following description of particular non-limitative embodiments of the invention.

BRIEF DESCRIPTION OF THE DRAWINGS

Reference will be made to the accompanying drawings, among which.

DETAILED DISCUSSION OF THE PREFERRED EMBODIMENTS

Figure 1:
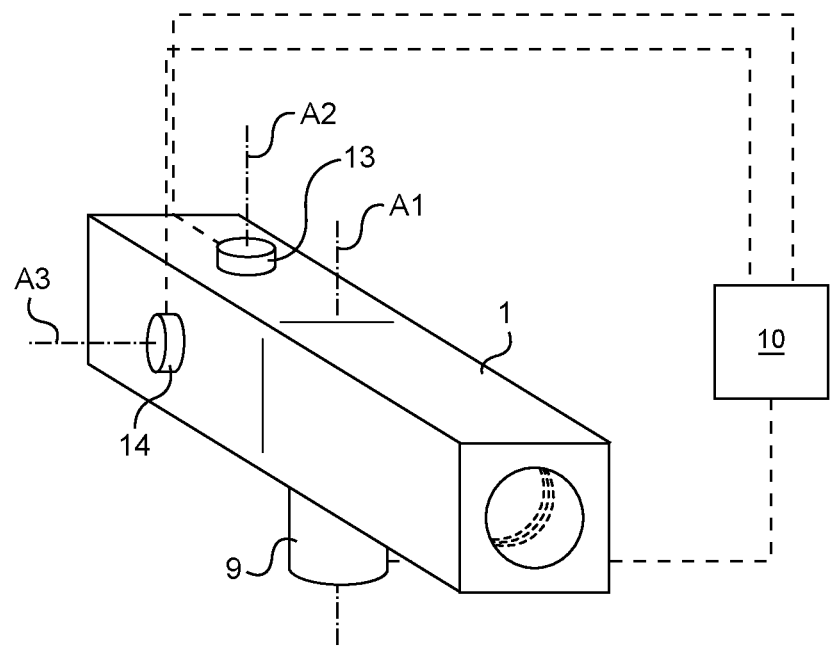
FIG. 1 is a schematic view in perspective of an optoelectronic system according the invention.

With reference to the figures, the optoelectronic surveillance system comprises an acquisition unit 1 comprising at least one sensor 2 mounted behind a zoom 3 having in front a group of movable lenses 4 and behind a group of fixed lenses 5 delimiting at least one first space 6 in convergent rays and at least one second space 7 in convergent rays. Some of the lenses in the group of movable lenses 4 are associated, in a manner known per se, with a drive device 8 for adjusting the magnification and the position of the focal point.

The acquisition unit 1 is mounted so as to pivot on a frame about an axis A1 extending here vertically. A drive device 9 is mounted on the frame in order to rotate the acquisition unit 1 about the axis A1.

The system comprises a control unit 10 connected to the sensor 2 and to the drive devices 8, 9 in order to control them.

The surveillance system comprises a first optical plate 11 mounted in the first space 6 in order to turn about an axis A2 and a second optical plate 12 mounted in the second space 7 in order to turn about an axis A3. The axis A3 is substantially perpendicular to the axis A2. Each optical plate 11, 12 is secured to an output shaft of a drive motor 13, 14 in order to rotate the optical plate 11, 12 in two opposite directions about the axis A2, A3.

The control unit 10 is connected to the drive motors 13, 14 in order to control them.

The control unit 10 is arranged so as to control the acquisition unit 1 in order to capture images on the fly during the rotation of the acquisition unit 1 about the axis A1.

The control unit 10 is arranged so as to control the drive unit 13 so as to modify a field perceived by the sensor 2 independently of a movement of the acquisition unit 1 about the axis A2. The control unit 10 is here more precisely arranged so as to control the drive motor 13 in order to keep constant the field perceived by the sensor 2 during a time of acquisition of at least one image and during the rotation of the acquisition unit 1 about the axis A1.

The control unit 10 is arranged so as to modify a field perceived by the sensor 2 independently of a movement of the acquisition unit 1 about the axis A3. More precisely, when the axis A1 is not entirely vertical (the vehicle on which the optoelectronic system is mounted is on a slope for example) and horizontal scanning is required, the control unit 10 is arranged so as to adjust the line of sight for elevation so that the line of sight travels over a substantially horizontal plane.

In normal operation, the motor 13 driving the plate 11 is controlled so as to lock the aim in a fixed spatial direction during the time of acquisition of an image (the plate 11 is then driven in a rotation direction opposite to that of the acquisition unit 1) and then so as to reposition the plate 11 for acquiring the following image (the plate 11 is then driven in the same rotation direction as the acquisition unit 1 but more quickly).

If the vehicle is on a slope, it is necessary for the camera to be pointed about an elevation axis determined so as to compensate for the slope during the rotation in a bearing about the axis A1. The first plate 11 is controlled about the axis A1 in order to compensate for the movement of the aim about the axis A1. The second plate 12 is controlled about the axis A3 in order to compensate for the movement of the aim about the elevation axis determined.

The control unit 10 is further arranged so as to perform image processing operations aimed at assembling the captured images in order to form a strip of images that corresponds to a panorama of 360° around the axis A1 and which can then be displayed on a suitable screen. The images are captured at a frequency suitable for causing a marginal overlap of the images with each other so that the overlap can be detected by the control unit 10 and used for connecting the images to one another over a turn of the acquisition unit 1.

In a first embodiment of the invention, the control unit 10 is arranged so as to control the rotation of the plate 1 and the sensor 2 in order to capture at least two successive images of the same portion of scene and to add these images in order to obtain a reconstituted image with the same resolution. These successive capture operations are performed over a complete turn of the acquisition unit 1 in order to obtain sufficient reconstituted images. The strip of images is next formed from the reconstituted images. An accumulation of frames is therefore made, making it possible to improve the signal to noise ratio.

In a second embodiment of the invention, the control unit 10 is arranged to control the rotation of the plate 11 and the sensor 2 in order to capture successive images of the same scene portion and to add pixels of these images in order to obtain a reconstituted image with a lower resolution. For example, for a processing operation following the acquisition, each pixel of the reconstituted image is the result of the adding of four pixels of the successive images. These operations are performed over a complete turn of the acquisition unit 1 in order to obtain sufficient reconstituted images. The strip of images is next formed from the reconstituted images (referred to as an E-bining method).

Preferably, the control unit 10 is arranged so as to function according to these two embodiments and selects the embodiment for example according to the photographing conditions. These embodiments are used when the integration times are lengthy, for example in infrared when the temperature is low.

Naturally, the invention is not limited to the embodiments described but encompasses any variant falling within the scope of the invention as defined by the claims.

In particular, the optoelectronic system may comprise only one rotary plate.

The invention is applicable to any optoelectronic surveillance system whatever the wavelengths in question, for example in the visible domain and the infrared.

Advantageously, the plates are also used for providing optical stabilisation of the zoom.

Figure 2:
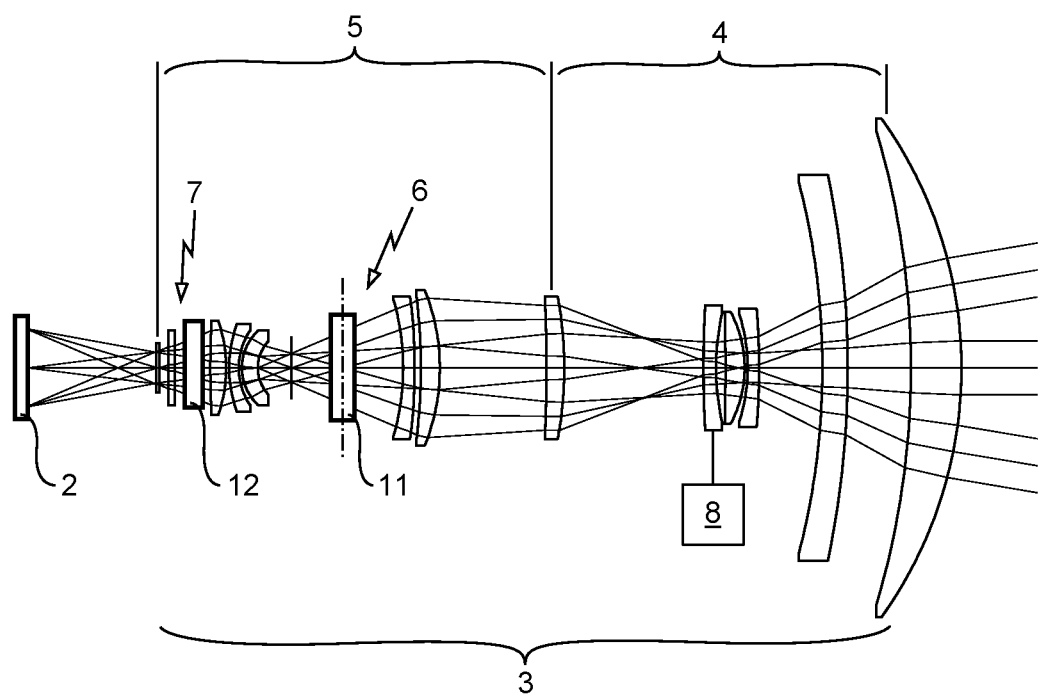
FIG. 2 is a schematic view of an optoelectronic system according to the invention, seen from the side perpendicularly to the optical axis.

The zoom may have an optical formula more complex or more simple than the one shown in FIG. 2.

The invention claimed is:

1. An optoelectronic surveillance system, comprising an acquisition unit including at least one sensor mounted behind a zoom having a group of movable lenses at the front and a group of fixed lenses at the rear, defining at least one first space with convergent rays, and a control unit connected to the acquisition unit and to a rotary optical element arranged so as to rotate about a first axis and secured to a drive member controlled by the control unit in order to modify a field perceived by the sensor independently of a movement of the acquisition unit about the first axis, wherein the optical element is a first transparent plate mounted in the first space so as to rotate about the first axis, and the drive member is arranged so as to rotate the first transparent plate in two opposite directions, the acquisition unit being mounted so as to turn about a second axis parallel to the first axis in a second rotation direction and the control unit is arranged so as to control the acquisition unit in order to capture images on the fly during the rotation of the acquisition unit about the second axis and the drive member in order to keep constant the field perceived by the sensor during a time of acquisition of at least one image.

2. The system according to claim 1, in which the first and second axes are substantially vertical.

3. The system according to claim 1, in which the group of fixed lenses delimits at least a second space with convergent rays in which at least one second transparent plate is mounted so as to turn about a third axis and is secured to a drive member arranged so as to rotate the second transparent plate in two opposite directions and controlled by the control unit so as to modify a field perceived by the sensor independent of a movement of the acquisition unit about the third axis, the third axis being substantially perpendicular to the second axis.

4. The system according to claim 1, in which the control unit is arranged so as to control the rotation of the plate and the sensor in order to capture at least two successive images of the same scene portion and to add these images in order to obtain a reconstituted image with the same resolution as the successive images.

5. The system according to claim 1, in which the control unit is arranged so as to control the rotation of the plate and the sensor in order to capture successive images of the same scene portion.

6. The system according to claim 2, in which the group of fixed lenses delimits at least a second space with convergent rays in which at least one second transparent plate is mounted so as to turn about a third axis and is secured to a drive member arranged so as to rotate the second transparent plate in two opposite directions and controlled by the control unit so as to modify a field perceived by the sensor independent of a movement of the acquisition unit about the third axis, the third axis being substantially perpendicular to the second axis.

* * * * *